United States Patent [19]

Hausmann

[11] 4,178,078
[45] Dec. 11, 1979

[54] AERODYNAMIC WINDOW

[75] Inventor: George F. Hausmann, Glastonbury, Conn.

[73] Assignee: United Technologies Corporation, Hartford, Conn.

[21] Appl. No.: 944,055

[22] Filed: Sep. 19, 1978

[51] Int. Cl.² .................................................. G02B 5/00
[52] U.S. Cl. .............................. 350/319; 331/94.5 G
[58] Field of Search ...................... 331/94.5 G, 94.5 D; 350/319; 313/30

[56] References Cited

U.S. PATENT DOCUMENTS

| | | | |
|---|---|---|---|
| 3,292,028 | 12/1966 | Van Ornum | 313/30 |
| 3,321,265 | 5/1967 | Clave et al. | 350/319 |
| 3,604,789 | 9/1971 | McLafferty | 350/319 |
| 3,617,928 | 11/1971 | Hausmann | 331/94.5 G |
| 3,873,939 | 3/1975 | Guile et al. | 350/319 |
| 3,907,409 | 9/1975 | Hausmann | 350/319 |
| 3,918,800 | 11/1975 | Griffin | 350/319 |
| 3,973,217 | 8/1976 | Guile | 350/319 |
| 3,973,218 | 8/1976 | Kepler et al. | 350/319 |
| 4,112,388 | 9/1978 | McLafferty | 350/319 |

Primary Examiner—John K. Corbin
Assistant Examiner—B. W. de los Reyes
Attorney, Agent, or Firm—Lawrence A. Cavanaugh

[57] ABSTRACT

An apparatus adapted for providing an aerodynamic window having a cylindrical configuration with an annular cross section capable of enveloping annularly a cavity therein is disclosed. The apparatus includes an annular injector adapted for providing a flow of first gas therefrom through a gas path having an annular cross section, an annular collector disposed in a spaced apart relation with the annular injector and adapted for collecting gas flowing through the gas path wherein the annular collector, the annular injector and the gas path cooperate to enclose a cavity therebetween and a gas insertion means for providing a flow of second gas within the cavity. In one embodiment electrodes disposed within the cavity are adapted for enhancing the energy level of the recipient elements of the second gas, as for example by ionization, to produce a high intensity light source. First gas passing through the flow path produces an aerodynamic window having an annular cross section capable of maintaining second gas within the cavity at a desired pressure level.

18 Claims, 5 Drawing Figures

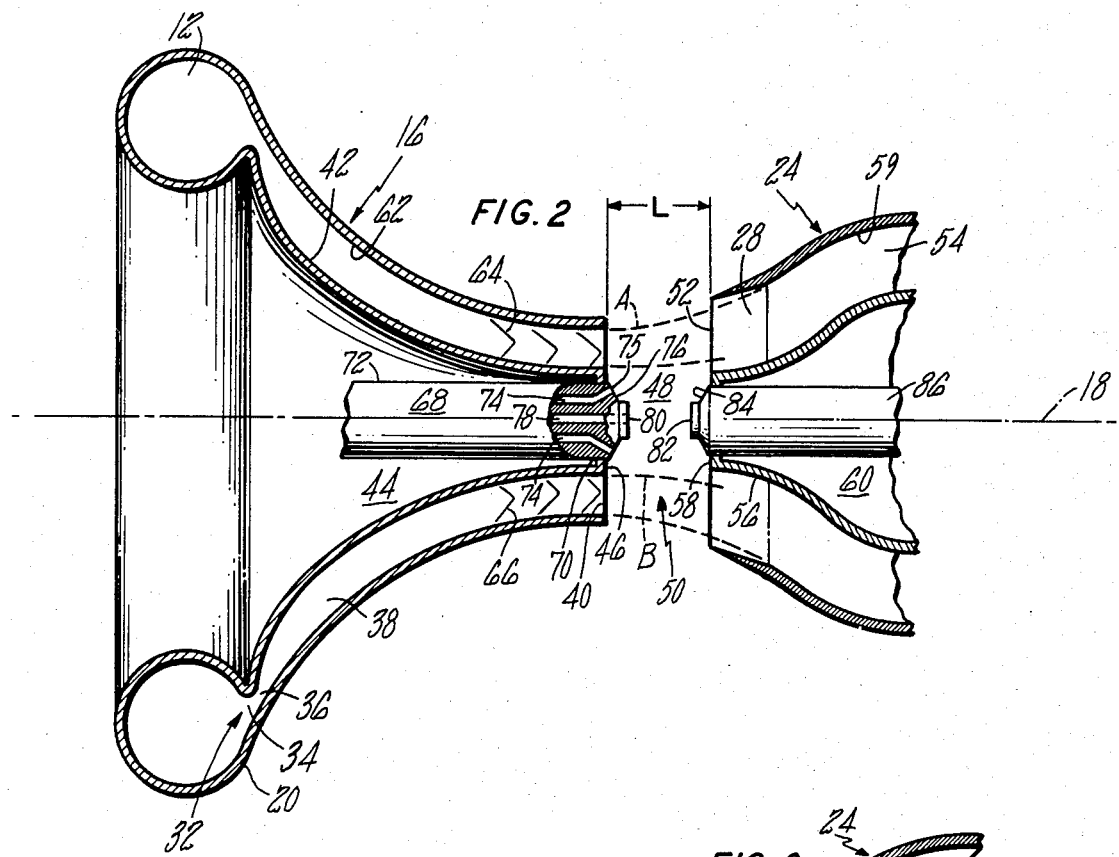

AERODYNAMIC WINDOW

BACKGROUND OF THE INVENTION

This invention relates to annular aerodynamic windows and more particularly to flashlamps having plasma containment with an annular aerodynamic window.

Plasma light sources capable of producing radiation having a high intensity are desirable for use as flashlamps and for use as pumping sources for high power lasers. In prior art devices, such as the flashlamp disclosed by Van Ornum in U.S. Pat. No. 3,292,028, radiation having a high intensity is typically produced in a plasma generated by an electric discharge or arc in a high pressure gas contained within a cavity enclosed by an envelope of solid material which is transparent at the wavelength of the radiation produced. The envelope is typically of silica or quartz material. The high current electric arc or spark which produces the plasma is typically gas vortex-stabilized along an axis within a predetermined arc region between electrodes by means of a gas which is introduced tangentially into the cavity containing the discharge.

The utilization of a transparent material to contain the gas and to allow radiation to pass therethrough results in a limitation being imposed on the intensity of the radiation obtainable from the flashlamp. The intensity of the radiation is a function of the pressure of the gas contained within the transparent envelope and of the amount of electric current passing through the gas. The pressure of the gas is limited by the mechanical properties of the transparent envelope and the amount of electric current passing through the gas is limited by the ability of the envelope to conduct heat, generated by the discharge within the gas, to a heat sink without producing a temperature within the envelope sufficient to cause discoloration or deterioration of the optical or mechanical properties thereof. A further limitation is the heat generated within the envelope by the absorption of a portion of the radiation passing therethrough. Although various cooling means have been devised to enhance the removal of heat from the envelope, the utilization of an envelope of solid material results in a limitation in the operational characteristics of the flashlamp.

An additional problem of prior art devices is the limited lifetime of the envelope due to discoloration during operation caused in part by the deposition of electrode material thereon, deterioration due to the high intensity radiation incident thereon, and from deposition of seed material within the high pressure gas onto the envelope. The seed material is typically inserted into the gas to obtain spectral selectivity of the radiation.

The present invention utilizes a cylindrical aerodynamic window defined by an annular flow path to replace the envelope of solid material to overcome some of the difficulties of prior art devices. Aerodynamic windows have been utilized in prior art devices to provide transparent windows for passing high intensity radiation therethrough while maintaining a pressure differential across the window. Hausmann in U.S. Pat. No. 3,617,928 filed May 23, 1968, discloses an aerodynamic window for a gas dynamic laser and in U.S. patent application Ser. No. 862,708 filed Dec. 20, 1977 discloses a spatial filter having aerodynamic windows on both sides of the filter to allow a high power laser beam to pass therethrough. Prior art aerodynamic windows have been two dimensional.

SUMMARY OF THE INVENTION

A primary object of the present invention is to provide an aerodynamic window having a cylindrical configuration with an annular cross section capable of maintaining an interior region at a desired pressure. A further object is to provide a flashlamp having high brightness and a long lifetime.

According to the present invention a truncated injector, having an annular configuration symmetrically disposed about a center line axis in a spaced apart relation to a collector having an annular configuration, is adapted for providing an annular flow of a first gas at supersonic velocity along a flowpath between the injector and the collector to form an aerodynamic window having a cylindrical cnfiguration with an annular cross section adapted for cooperating with the injector and the collector to enclose a cavity therebetween. The injector includes a core region capable of accommodating gas handling means for maintaining a second gas within the cavity at a desired pressure.

The injector comprises a torroidal plenum chamber having an inlet port adapted for connection to a source of first gas and an exit adapted for passing a first gas annularly therefrom, a truncated annular flow duct having a first end attached to and enclosing the exit of the plenum chamber and a second end having an annular exit adapted for providing an upstream end of the aerodynamic window. The annular flow duct includes a supersonic nozzle adapted for expanding the flow of first gas to supersonic velocities and has a curvilinear configuration adapted for providing a flow of gas through the flow path wherein the gas has a dynamic pressure distribution across the annular diameter of the flow path capable of supporting a pressure differential between the atmosphere within the cavity and the atmosphere external to the cavity. The collector comprises an annular collection duct having an entrance at one end, encircling a core region, adapted for collecting the flow of gas from the injector and for directing the collected gas to a diffuser wherein the entrance defines the downstream end of the aerodynamic window.

A primary feature of the present invention is the curvilinear configuration of the annular flow duct adapted for providing an annular gas flow path between the injector and the collector capable of supporting a pressure differential between the atmosphere within the cavity and the atmosphere external to the cavity. In one embodiment the annular duct of the injector has a curvilinear configuration adapted for supporting a large pressure differential between the atmosphere external to the cavity and the atmosphere within the cavity. In a further embodiment the annular flow duct has a curvilinear configuration adapted for supporting a large pressure differential between the atmosphere within the cavity and the atmosphere external to the cavity enabling a second gas to be maintained within the cavity at a pressure less than the pressure external to the cavity. In one embodiment of the present invention a first electrode fixedly positioned within the cavity juxtaposed the core region of the annular injector and a second electrode fixedly positioned within the cavity juxtaposed the core region of the annular collector are adapted for enhancing the population of ionized and excited states of the recipient elements within the second gas to provide a plasma within the cavity capable of producing radiation having a high intensity. In a still further embodiment the population of ionized and excited states of the recipient element of the second gas are enhanced by a radio frequency induction coil disposed external to the cavity symmetrically about the center line axis. In a still further embodiment focusing optics transversely disposed to the center line axis external to the cavity are adapted for focusing radiation having high intensity into the cavity to enhance the population of ionized and excited states of the recipient elements of the gases maintained therein to provide a high intensity light source.

A primary advantage of the present invention is the elimination of a solid transparent envelope of material such as quartz or the like required of prior art devices for maintaining a gas within the cavity. Additionally the annular aerodynamic window is capable of containing gases within the cavity at pressure levels exceeding twenty atmospheres with atmospheric pressure external to the cavity. Also spectral selectivity of the radiation emanating from the enhanced energy levels within the gas maintained within the cavity is possible by seeding the gas flowing into the cavity without the deleterious effects of depositing seed material on the envelope enclosing the cavity. Additionally the lifetime of the device when utilized as a flashlamp is enhanced since the transparent envelope enclosing the cavity is not discolored during operation and the operating pressure of the flashlamp is not limited by the mechanical strength of the envelope. In the embodiment utilizing radiation having high intensity to enhance the population of ionized and excited states of the gas within the cavity, the requirement for using electrodes or radio frequency energy enhancement means is eliminated. Additionally when this embodiment is utilized, a discharge region within the cavity is well defined with no fringing fields as with conventional radio frequency and electrode driven discharges and a faster rise time of the flashlamp radiation is obtainable as well as a high pulse repetition rate. Also the plasma is not contaminated by electrode erosion. Additionally impedance matching problems between the power supply and the arc discharge of conventional flashlamps are eliminated.

These and other objects, features and advantages of the present invention will become more apparent in the light of the following detailed description of the preferred embodiments thereof as discussed and illustrated in the accompanying drawings.

BRIEF DESCRIPTION OF THE DRAWINGS

FIG. 1 is a partially broken away simplified perspective view of an apparatus adapted for having an annular aerodynamic window capable of maintaining a cavity at a pressure higher than the pressure of the atmosphere outside the cavity;

FIG. 2 is a simplified cross-sectional view of the principal components of the present invention including electrical means for enhancing the population of ionized and excited states of recipient elements of a gas maintained within the cavity;

FIG. 3 is a simplified cross-sectional view of the aerodynamic window section of an embodiment of the present invention showing optical population enhancement means;

DESCRIPTION OF THE PREFERRED EMBODIMENTS

Figure 4:
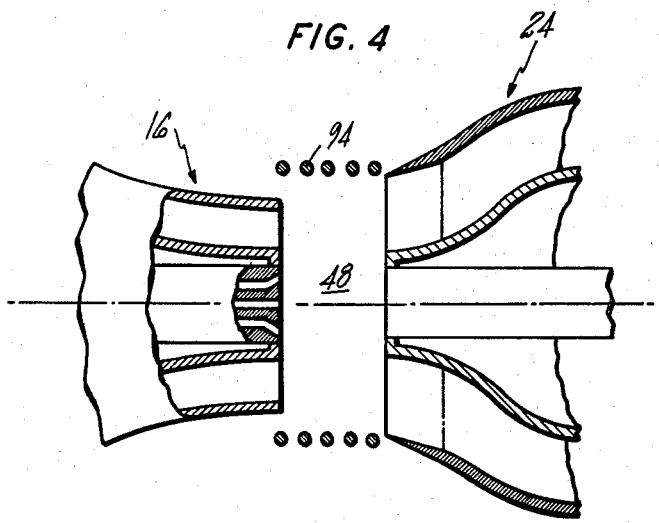
FIG. 4 is a simplified cross-sectional view of the aerodynamic window portion of the present invention showing a further embodiment of the population enhancement means.

Referring now to FIG. 1 which shows a partially broken away simplified perspective view of the principal components defining the aerodynamic window portion of the present invention including an annular injector 10 having a torroidal plenum chamber 12 with a gas inlet 14 attached thereto and an annular flow duct 16 having the configuration of an annular funnel as hereinafter described symmetrically disposed about a center line axis 18 with a first end 20 annularly attached to the plenum chamber and terminating at a second end 22 wherein the second end has a diameter less than the diameter of the first end. The present invention further includes an annular collector 24, symmetrically disposed about the center line axis, having a first end 26 disposed downstream the second end 22 of the annular flow duct in a spaced apart relationship providing a separation of length L therebetween and a collection duct 28 with a conical configuration extending from the first end 26 of the annular collector downstream to a second end 30 wherein the diameter of the first end is less than the daimeter of the second end. The annular injector and the annular collector are aerodynamically adapted for providing an aerodynamic window having a substantially cylindrical configuration with an annular cross section enveloping the separation therebetween as hereinafter described.

Referring now to FIG. 2 which shows a cross-sectional view of the present invention as shown in FIG. 1 wherein the torroidal plenum chamber 12 has an annular exit 32 to which the first end 20 of the annular flow duct 16 is attached. The annular flow duct 16, having the configuration of an annular funnel, includes an annular entrance chamber 34 at the large diameter end of the duct which is attached at one end to the plenum chamber enclosing the annular exit 32 and adapted for receiving a flow of first gas therefrom and a truncated annular supersonic nozzle 36 attached at one end to the downstream end of the entrance chamber 34 and at the other end to the upstream end of an injection duct 38 having a curvilinear configuration which terminates at an exit 40 at the second end 22 of the annular flow duct. The interior wall 42 of the injection duct 38 defines the radial boundary of a core region 44 and terminates at the second end 22 of the annular flow duct with an end cap 46 which cooperates with the interior wall 42 to enclose the core region 44 of the annular injector 10 and provides the upstream end of a cavity 48 of length L enclosed between the annular injector 10 and the annular collector 24. The interior wall forms a surface of revolution about the center line axis radially enveloping the core region. An annular flow path 50 defining an aerodynamic window having a cylindrical configuration as hereinafter described envelopes the cavity 48.

The collection duct 28, having an annular entrance 52 in flow alignment with the exit 40 of the injector duct 38 is adapted for collecting first gas passing from the injector duct through the flow path 50 and for directing the first gas to a diffuser section 54 located downstream the entrance 52. The interior surface 56 of the collection duct, adapted for providing an attachment surface for the flow of first gas through the flow path 50, terminates at the cavity boundary with a collector end cap 58 and is maintained in a spaced apart relationship to the exterior surface 59 of the collection duct by means well known in the art, such as struts (not shown). The collector end cap encloses the core region 60 of the annular collector and defines the downstream end of the cavity 48.

Referring now to FIGS. 1 and 2, in operation a source of first gas (not shown) such as xenon or most any othergas is connected to the gas inlet 14 and the torroidal plenum chamber 12 is pressurized to a high pressure. The high pressure first gas passes through the annular exit 32 of the plenum chamber into the entrance chamber 34 and is expanded to supersonic velocity with the annular supersonic nozzle 36. The expanded gas passes through the injection duct 38, interacting with an outer wall 62 having a curvilinear configuration to generate expansion waves 64 therein and with the interior wall 42 to generate shock waves 66. The outer wall 62 and the interior wall 42 have a curvilinear configuration adapted for providing a gas flow through the flow path having a dynamic pressure along the shear boundary A between the exterior atmosphere and the flow path 50 equal to the pressure of the exterior atmosphere and a dynamic pressure along the shear boundary B between the flow path and the cavity equal to the pressure of gas within the cavity. In the preferred embodiment the gas flow has an essentially shock free distribution through the portion of the flow path defining the aerodynamic window. The gas flows through the gas path into the collection duct 28 and then through the diffuser 54 to either the atmosphere or to a circulating system (not shown) for circulating the first gas back to the plenum chamber 12.

The flow of supersonic gas passing from the exit 40 of the injection duct 38 to the entrance 52 of the collection duct 28 defines the annular flow path 50 which cooperates with the annular injector 10 and the annular collector 24 to enclose the cavity 48 therebetween. The flow of first gas at supersonic velocity from the injector assembly to the annular collector with the resulting expansion and shock waves produces a transparent aerodynamic envelope capable of maintaining a high pressure differential between the atmoshere within the cavity 48 and the atmosphere external to the cavity. For a more complete description of the operational characteristics to two-dimensional aerodynamic windows reference is hereby made to U.S. Pat. No. 3,973,218 filed Mar. 21, 1975 by Kepler et al. and held with the present application by a common assignee which is herewith incorporated by reference into the present application. Although the present invention involves a three-dimensional aerodynamic window, it is to be recognized that the description of the physical phenomena resulting in a two-dimensional window will approximate the description of the phenomena resulting in a three-dimensional window.

Calculations well known within the art of two-dimensional aerodynamic windows can show that very high pressures may be sustained within the cavity without leakage to the atmosphere outside the cavity. For example, a cavity pressure of 285 psia may be maintained with normal atmospheric pressure outside the cavity when the pressure within a plenum is approximately 2200 psia. In the present invention for these conditions, the expansion ratio of the supersonic nozzle 36 and the curvature of the interior wall 42 and exterior wall 62 defining the annular duct 38 may be designed to provide a Mach number of 4.0 at the shear boundary between the aerodynamic window and the external atmosphere and a Mach number of 2.0 at the shear boundary between the aerodynamic window within the cavity may be increased or decreased by increasing or decreasing the pressure within the torroidal plenum.

Referring again to FIG. 2, a gas handling assembly 68 disposed symmetrically about the center line axis 18 within the core region 44 of the annular injector 10 extends into the cavity 48 through an aperture 70 within the end cap 46. The outer surface 72 of the gas handling assembly has a cylindrical configuration sealably engaged with the inner wall of the end cap defining the aperture to form a gas tight seal. Gas inlet passages 74 having a first end (not shown) adapted for connection to a source of second gas (not shown) extend through the gas handling assembly and terminate at an exit 75 at the cavity end 76 of the gas handling assembly. The exit 75 of the gas inlet passage is angularly disposed to inject second gas into the cavity tangentially to the center line axis. A gas exit passage 78 symmetrically disposed about the center line axis within the gas handling assembly 68 is adapted for passing gases from the cavity 48 to the atmosphere or to recirculating means (not shown) connected to the source of second gas.

A first electrode 80 attached to the cavity end 76 of the gas handling assembly projects into the cavity 48 toward the annular collector 24. A second electrode 82, disposed within the cavity in a spaced apart relationship to the first electrode 80 located within the cavity proximate the downstream end of the cavity, is attached to a cavity end 84 of a second gas handling assembly 86 extending from the core region 60 of the annular collector through an aperture in the collector cap 58 into the cavity. The second gas handling assembly is shown without gas passages. It is to be recognized that gas passages may be located within the second gas handling assembly and that the gas handling assembly 68 and the second gas handling assembly 86 may be interchanged. Additionally it is to be recognized that the second electrode may be attached to the surface of the collector cap 58. It is also to be recognized that the annular collector 24 may have a solid core region 60 with either a flat surface or a truncated conical surface adjacent the cavity to which the second electrode 60 may be attached. Additionally the flat or conical surface of the core end may also be utilized at the electrode.

The first and second electrodes are adapted for depositing electrical energy into the second gas to enhance the population of ionized and excited states of the recipient elements resulting in the generation of a plasma capable of producing radiation having a high intensity to form an intense light source. The wavelength of the radiation generated by the light source may be selected by appropriate choice of second gas or by seeding the second gas with appropriate material. The second gas is introduced tangentially into the cavity to provide a stabilization vortex around the discharge.

In operation of the present invention as a high intensity flashlamp, an aerodynamic window is first formed enveloping the cavity 48 by pressurizing the plenum 12 and flowing a first gas at supersonic velocities across the separation between the annular injector 10 and the annular collector 24 as hereinbefore described. A source of second gas, (not shown) typically argon, xenon or other gas capable of having its energy levels being enhanced as for example by ionization, connected to the inlet passages 74 provides a flow of second gas into the cavity 48 and maintains the gas within the cavity at a particular pressure. An electric field maintained between the first and second electrodes 80, 82 respectively, results in the generation of a high intensity plasma therebetween providing a high intensity light source. Radiation from the light source passes out of the cavity through the aerodynamic window. In the preferred embodiment second gas is continuously passed into the cavity through the gas inlet passages 74 and is continuously passed out of the cavity through the gas exit passage 78. It is to be recognized that once the aerodynamic window envelopes the cavity, second gas may be maintained within the cavity without loss of gas pressure through the aerodynamic window.

In accordance with the present invention radiation passing out of the cavity is not absorbed within the aerodynamic window and the cooling requirements of conventional windows are eliminated. Additionally deterioration due to discoloration from absorption of the radiation within the window and from deposition of electrode material and seed material in the second gas onto the window is also eliminated. Also, the aerodynamic window does not have the mechanical strength limitations of prior art windows enabling the cavity to be maintained at higher gas pressures with a resultant increase in the intensity of the light generated within the cavity.

Referring now to FIG. 3 which shows a sectional view of the aerodynamic window portion of the present invention together with optical means for enhancing the population of ionized and excited energy states of the recipient elements of the second gas. The gas handling assembly 72a located within the core region 44 includes the gas insertion passages 74 and gas exit passages 78 as shown in FIG. 2. The gas handling assembly is shown terminating coplanar with the surface of the end cap 46 defining the upstream end of the cavity 48. An energy beam 88 from an energy source 90 such as a laser is focused by focusing optics 92 into the cavity preferably to the center line axis to enhance the population of ionized and excited energy states of the recipient elements within the second gas contained therein to generate a plasma capable of producing radiation having high intensity. The focusing optics as shown has a spherical geometry adapted for producing a focal volume of high intensity laser radiation within the central region of the cavity. Cylindrical optics may also be employed to produce a high intensity focal line of laser radiation at the center of the cavity typically along the center line axis. The utilization of an energy beam interacting with the gas to form the plasma eliminates the use of the electrodes as shown in FIG. 2 and the resulting problems associated with electrode induced discharges such as electrode spalling, outgassing and impedance matching of electrical power supplies with the arc discharge. Additionally the flashlamp may be operated at high pulse repetition rates with the light pulses generated having a fast rise time.

FIG. 4 shows a further embodiment of the present invention wherein an induction coil 94 symmetrically disposed about the center line axis external to the cavity is adapted for providing an electromagnetic field within the cavity capable of enhancing the energy states of the recipient element within the second gas.

Figure 5:
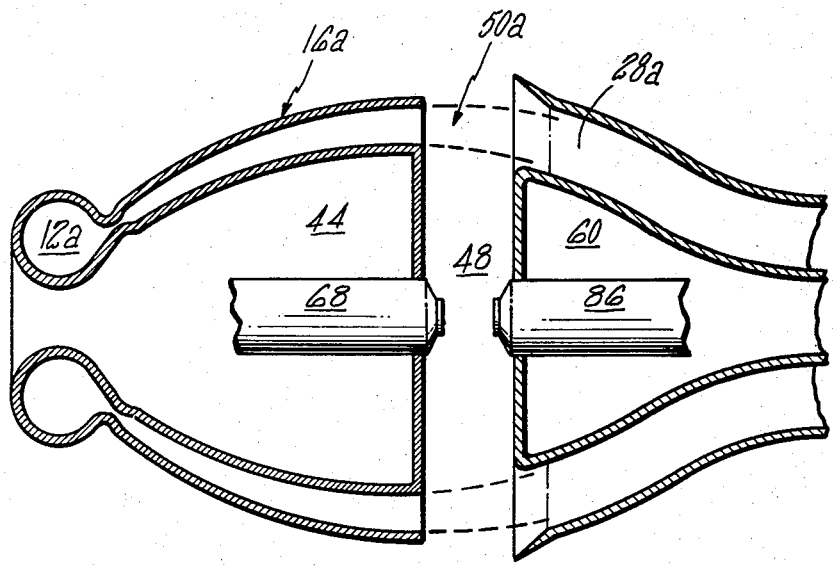
FIG. 5 is a simplified cross-sectional view of an embodiment of the present invention adapted for maintaining a cavity at a pressure lower than the pressure of the atmosphere outside the cavity.

FIG. 5 shows a still further embodiment of the present invention wherein the annular flow duct 16a has a configuration adapted for maintaining the second gas within the cavity 48 at a pressure less than the pressure of the atmosphere outside the cavity. In this embodiment the annular flow duct 16a and the collection duct 28a are adapted for cooperating with a plenum 12a pressurized to a high pressure to provide a flow path 50a, concave to the cavity, capable of supporting a large pressure differential between the atmosphere outside the cavity and a pressure lower than atmosphere within the cavity.

Thus it is readily apparent that an annular aerodynamic window provides an envelope capable of maintaining a gas at high pressure within a cavity defined in part by the envelope while providing a window transparent at the wavelength of the radiation generated within the cavity to provide a flashlamp capable of generating intense radiation without the limitations inherent in prior art devices having solid windows of quartz or the like.

As will be apparent to persons skilled in the art, various modifications, adaptations and variations of the foregoing specific disclosure can be made without departing from the teachings of this invention.

Having thus described typical embodiments of my invention that which I claim as new and desire to secure by Letters Patent of the United States is:

1. An apparatus adapted for providing an aerodynamic window capable of enveloping annularly a cavity therein to maintain a gas within the cavity at a desired pressure comprising:
   a truncated injector, having an annular configuration symmetrically disposed about a center line axis, adapted for expanding a first gas to supersonic velocity to provide a flow of first gas through a flow path having a cylindrical configuration with an annular cross section;
   an annular collector, disposed symmetrically about the center line axis in a spaced apart relationship with the truncated injector, having an annular collection duct in flow alignment with the truncated injector and the flow path wherein the annular collector cooperates with the annular injector and the flow path to define a cavity therebetween; and
   means for providing a flow of second gas into the cavity, said means adapted for maintaining the second gas within the cavity at a desired pressure level while said first gas flows through the flow path to form an aerodynamic window annularly enveloping the cavity.

2. The invention in accordance with claim 1 wherein the truncated injector comprises:
   an annular plenum chamber having an inlet port adapted for connection to a source of first gas and an annular exit adapted for passing first gas annularly therefrom;
   a truncated flow duct having a curvilinear configuration with an annular cross section including a first end attachment to and enclosing the annular exit of the plenum chamber and a second end having an annular exit adapted for providing an upstream end of the flow path enveloping the cavity wherein the flow duct has a curvature adapted for providing a flow of first gas through the flow path to the annular collector to form an aerodynamic window defined by the flow path and;

a core region, annularly enveloped by the truncated low duct, adapted for accommodating gas handling means for passing a second gas through the cavity.

3. The invention in accordance with claim 2 wherein the truncated flow duct includes an entrance chamber at the first end having an annular cross section adapted for attachment to the plenum chamber, a supersonic nozzle annularly attached to a downstream end of the entrance chamber and an injection duct attached at one end to the downstream end of the supersonic nozzle and terminating at the second end of the truncated flow duct.

4. The invention in accordance with claim 2 wherein the truncated flow duct has the configuration of an annular funnel.

5. The invention in accordance with claim 2 wherein the first end has a diameter larger than the diameter of the second end.

6. The invention in accordance with claim 2 wherein the truncated flow duct has a curvilinear configuration adapted for providing a flow of first gas through the flow path to form an aerodynamic window capable of supporting a large pressure differential between the pressure of an atmosphere external to the cavity and the pressure of second gas maintained within the cavity wherein the cavity is maintained at a pressure greater than the pressure of the atmosphere external to the cavity.

7. The invention in accordance with claim 2 wherein the truncated flow duct has a curvilinear configuration adapted for providing a flow of first gas through the flow path to form an aerodynamic window capable of supporting a large pressure differential between the pressure of an atmosphere external to the cavity and the pressure of second gas within the cavity wherein the cavity is maintained at a pressure less than the pressure of the atmosphere external to the cavity.

8. The invention in accordance with claim 2 wherein the gas handling means is a gas handling assembly extending through the core region into the cavity through an aperture in an end cap enclosing the core region and defining an upstream end of the cavity wherein the gas handling assembly includes a gas inlet passage adapted for passing a second gas through the core region into the cavity and a gas exit passage adapted for passing second gas out of the cavity.

9. The invention in accordance with claim 8 wherein the gas inlet passage is adapted for passing second gas into the cavity tangentially to the center line axis.

10. The invention in accordance with claim 1 further including means for enhancing the population of ionized and excited energy states of recipient elements of the second gas.

11. The invention in accordance with claim 10 wherein the means for enhancing the population of ionized and excited energy states includes a first electrode positioned within the cavity at an upstream end thereof and a second electrode positioned within the cavity at a downstream end thereof wherein the first and second electrodes are adapted for maintaining an electric field therebetween.

12. The invention in accordance with claim 10 wherein the means for enhancing the population of ionized and excited energy states includes an induction coil symmetrically disposed about the center line axis external to the cavity wherein the induction coil is adapted for providing an electromagnetic field within the cavity capable of enhancing the population of ionized and excited energy states.

13. The invention in accordance with claim 1 further including:
a source of radiation located external to the cavity capable of producing radiation having high intensity;
focusing means for focusing the radiation into the cavity to enhance the population of ionized and excited energy states of recipient elements of the second gas to provide a high intensity light source within the cavity.

14. The invention in accordance with claim 13 wherein the source of radiation is a laser.

15. The invention in accordance with claim 13 wherein the focusing means is a lens having a cylindrical configuration adapted for focusing the radiation to a focal line within the cavity.

16. The invention in accordance with claim 13 wherein the focusing means is a lens having a spherical configuration adapted for focusing the radiation to a focal volume within the cavity.

17. The method for forming an annular aerodynamic window comprising:
pressurizing a plenum chamber with a first gas;
passing the first gas through a truncated annular flow duct having a configuration adapted for providing a flow of first gas through a cylindrical gas path having an annular cross section to form an aerodynamic window capable of maintaining a pressure differential between the pressure of an atmosphere exterior to the cylindrical flow path and the pressure of a second gas interior to the cylindrical flow path;
collecting the first gas passing through the annular flow path with an annular collector maintained in flow alignment and in a spaced apart relationship with the annular flow duct wherein the annular collector cooperates with the annular injector at the flow path to enclose a cavity therebetween.

18. The invention in accordance with claim 17 further including:
maintaining a second gas within the cavity; and
enhancing the population of ionized and excited energy levels of recipient elements of the second gas to form a light source within the cavity capable of providing radiation having a high intensity.

* * * * *

UNITED STATES PATENT AND TRADEMARK OFFICE
CERTIFICATE OF CORRECTION

PATENT NO. : 4,178,078
DATED : December 11, 1979
INVENTOR(S) : George Finley Hausmann It is certified that error appears in the above-identified patent and that said Letters Patent are hereby corrected as shown below:

Column 2, line 17, "cnfiguration" should read --configuration--.

Column 5, line 12, "othergas" should read --other gas--.

Claim 2, column 8, line 60, "attachment" should read --attached--.

Signed and Sealed this

Fifteenth Day of April 1980

[SEAL]

Attest:

SIDNEY A. DIAMOND

Attesting Officer

Commissioner of Patents and Trademarks